(12) United States Patent
Basson et al.

(10) Patent No.: US 8,547,214 B2
(45) Date of Patent: Oct. 1, 2013

(54) SYSTEM FOR PREVENTING HANDHELD DEVICE USE WHILE OPERATING A VEHICLE

(75) Inventors: Sara H. Basson, White Plains, NY (US); Dimitri Kanevsky, Ossining, NY (US); David Nahamoo, Great Neck, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 12/814,429

(22) Filed: Jun. 11, 2010

(65) Prior Publication Data

US 2011/0304446 A1 Dec. 15, 2011

(51) Int. Cl.
*G08B 23/00* (2006.01)
*G08B 29/00* (2006.01)
*B60Q 1/00* (2006.01)

(52) U.S. Cl.
USPC ............ 340/438; 340/5.1; 340/5.2; 340/5.51; 340/5.52; 340/5.53; 340/5.81; 340/5.82; 340/5.83; 340/5.84; 340/439

(58) Field of Classification Search
None
See application file for complete search history.

(56) References Cited

U.S. PATENT DOCUMENTS

| | | | |
|---|---|---|---|
| 2006/0212195 A1* | 9/2006 | Veith et al. | 701/35 |
| 2007/0200663 A1* | 8/2007 | White et al. | 340/5.31 |
| 2008/0106390 A1* | 5/2008 | White | 340/426.11 |
| 2011/0304465 A1* | 12/2011 | Boult et al. | 340/576 |
| 2012/0220284 A1* | 8/2012 | Tadayon et al. | 455/418 |
| 2012/0235883 A1* | 9/2012 | Border et al. | 345/8 |

* cited by examiner

*Primary Examiner* — Julie Lieu
(74) *Attorney, Agent, or Firm* — Ido Tuchman; Anne V. Dougherty

(57) ABSTRACT

Techniques for preventing a driver of a moving vehicle from using a handheld device while driving. An example system of the invention includes a plurality of biometric sensors configured to receive biometric data from the driver and a user of the handheld device. Contemporaneously with operation of the vehicle and the handheld device, the biometric data is analyzed in order to determine a match between the identity of the vehicle driver and the user of the handheld device. A controller is configured to selectively interrupt operation of the vehicle or handheld device upon detecting the match.

22 Claims, 5 Drawing Sheets

SYSTEM FOR PREVENTING HANDHELD DEVICE USE WHILE OPERATING A VEHICLE

BACKGROUND

The present invention relates generally to a method, system, and computer program product for using a handheld device. More specifically, the present invention relates to preventing usage of a handheld device while operating a vehicle.

Legislation is increasing across the United States to limit handheld use of cellular phones while driving a vehicle. Some states require hands-free cell phone use if the phone is to be used while driving. Legislation is also underway to eliminate texting while driving, which inevitably occupies the driver's eyes and hands and therefore impairs driving safety.

Many ideas have been developed to minimize holding a cellular phone while driving. For example, hands-free headsets, bluetooth devices and cellular phones physically incorporated within cars are known. However, these devices are not utilized by everyone due, for example, to comfort and cost factors.

Enforcing laws prohibiting use of handheld devices while driving is cumbersome and imperfect. Users need to be seen using handheld devices while driving; this occupies valuable police resources that can be deployed elsewhere. It is also unlikely to catch most offenders by observation alone.

SUMMARY

An example embodiment of the present invention is a method for preventing a vehicle driver from using a handheld device while operating a vehicle. The method includes analyzing biometric data contemporaneously with operation of the vehicle and the handheld device to determine a match between the identity of the vehicle driver and a user of the handheld device. An interrupting step selectively interrupts operation of the vehicle or the handheld device upon detecting the match.

Another example embodiment of the invention is a system for preventing a driver of a moving vehicle from using a handheld device while driving. The system includes a plurality of biometric sensors configured to receive biometric data from the driver and a user of the handheld device. A data analyzer is configured to analyze, contemporaneously with operation of the vehicle and the handheld device, the biometric data in order to determine a match between the identity of the vehicle driver and the user of the handheld device. A controller is configured to selectively interrupt operation of the vehicle or the handheld device upon detecting the match.

Yet another example embodiment of the invention is a computer program product for preventing a vehicle driver from using a handheld device while operating a vehicle. The computer program product includes computer readable program code configured to analyze biometric data contemporaneously with operation of the vehicle and the handheld device to determine a match between the identity of the vehicle driver and a user of the handheld device, and selectively interrupts operation of the vehicle or the handheld device upon detecting the match.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-5.

As discussed in more detail below, example aspects of the invention relate to a method and system for preventing a vehicle driver from using a handheld device while operating a vehicle. A plurality of biometric sensors can be placed on both the moving vehicle as well as the handheld device that can detect if the driver is using the handheld device. One such handheld device is a cellular phone. Biometric sensors may be placed in various locations, such as on the keypad and/or the back of the cellular phone. Once biometric data is detected, an analyzer can match the input data with previously stored data contemporaneously with operation of the vehicle and the handheld device. The analysis may include using a computer processor coupled to computer readable memory that can retrieve stored data once biometric data is detected.

Embodiments of the current invention take advantage of various biometric sensors to improve the accuracy of identification. In an embodiment of the invention, other sources of data, such as vehicle movement data and environmental data, can be used in the data analysis. Combining the biometric and non-biometric data contemporaneously with operation of the moving vehicle and handheld device allows the controller to determine if the operation of either the handheld device or the vehicle should continue. In addition, the controller can provide various responses, such as sending a warning to the driver to stop using the handheld device. If preconditions are met in the data analysis, the controller may, for example, selectively interrupt operation of the vehicle or the handheld device while allowing for communication with emergency numbers.

Figure 1:
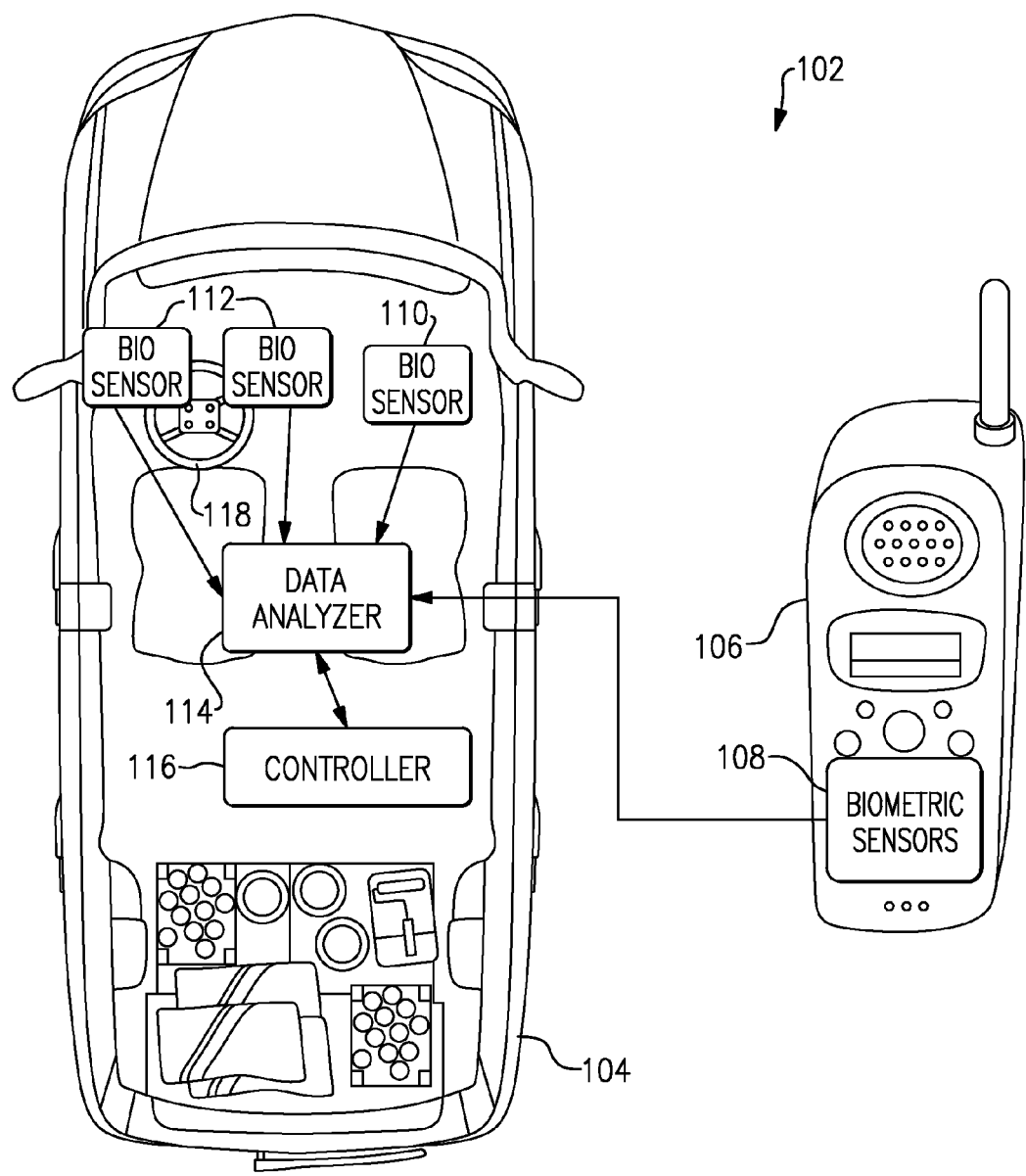
FIG. 1 shows an example system for preventing a driver of a moving vehicle from using a handheld device 106 while driving, as contemplated by the present invention FIG. 2 provides further detail about the example system of FIG. 1 for preventing a driver of a moving vehicle from using a handheld device while driving.

FIG. 1 illustrates an example system 102 for preventing a driver of a moving vehicle 104 from using a handheld device 106 while driving, as contemplated by the present invention. The handheld device 106 may include, but is not limited to, cellular phones, mobile computers, personal digital assistants, handheld game consoles, portable media players, e-book readers and personal navigation devices.

Biometric sensors 108 located on the handheld device 106 are configured to receive biometric data. A plurality of biometric sensors 110 and 112 in the vehicle 104 are used to detect biometric data from the driver. The biometric data may include, but is not limited to, digital representations of fingerprints, voice patterns, facial images, retina images, heartbeat, body weight, and/or body temperature. The use of multiple biometric sensors could be used to strengthen the likelihood of a correct identification.

One or more biometric sensors located at the vehicle 104 may obtain the biometric data. The system 102 may further include a first biometric sensor 108 located on the handheld device 106 and a second biometric sensor 112 located on the steering wheel 118 of the vehicle. The first biometric sensor 108 may include a pulse detector located on the handheld device 106 and the second biometric sensor 112 may include a pulse detector located on the steering wheel 118. A data analyzer 114 may be included to determine if a first received pulse from the first pulse detector is synchronized with a second received pulse from the second pulse detector.

There may be multiple sensors in various positions in the vehicle 104. In one embodiment of the system, a biometric sensor 110 may be located on the driver's seat in order to detect the driver's body weight. Alternatively, retina-scanning sensors could be placed in a variety of positions, such as the steering wheel 118 or a mounted camera in the vehicle. The system 102 might further include, but is not limited to, placing retina scanning sensors in the rearview mirror or the side view mirrors.

The data analyzer 114 uses a computer processor to analyze the biometric data contemporaneously with operation of the vehicle 104 and the handheld device 106 in order to determine a match between the identity of the vehicle driver and the handheld device user. Upon detecting a match, a controller 116 can selectively interrupt operation of the vehicle 104 or the handheld device 106 under certain conditions. For example, the controller 116 may be configured such that it would not disable operation of the handheld device when the user of the handheld device is communicating with emergency responders. Furthermore, interrupting operation of the vehicle 104 or the handheld device 106 may include issuing a warning to the vehicle driver to stop using the handheld device.

Figure 2:
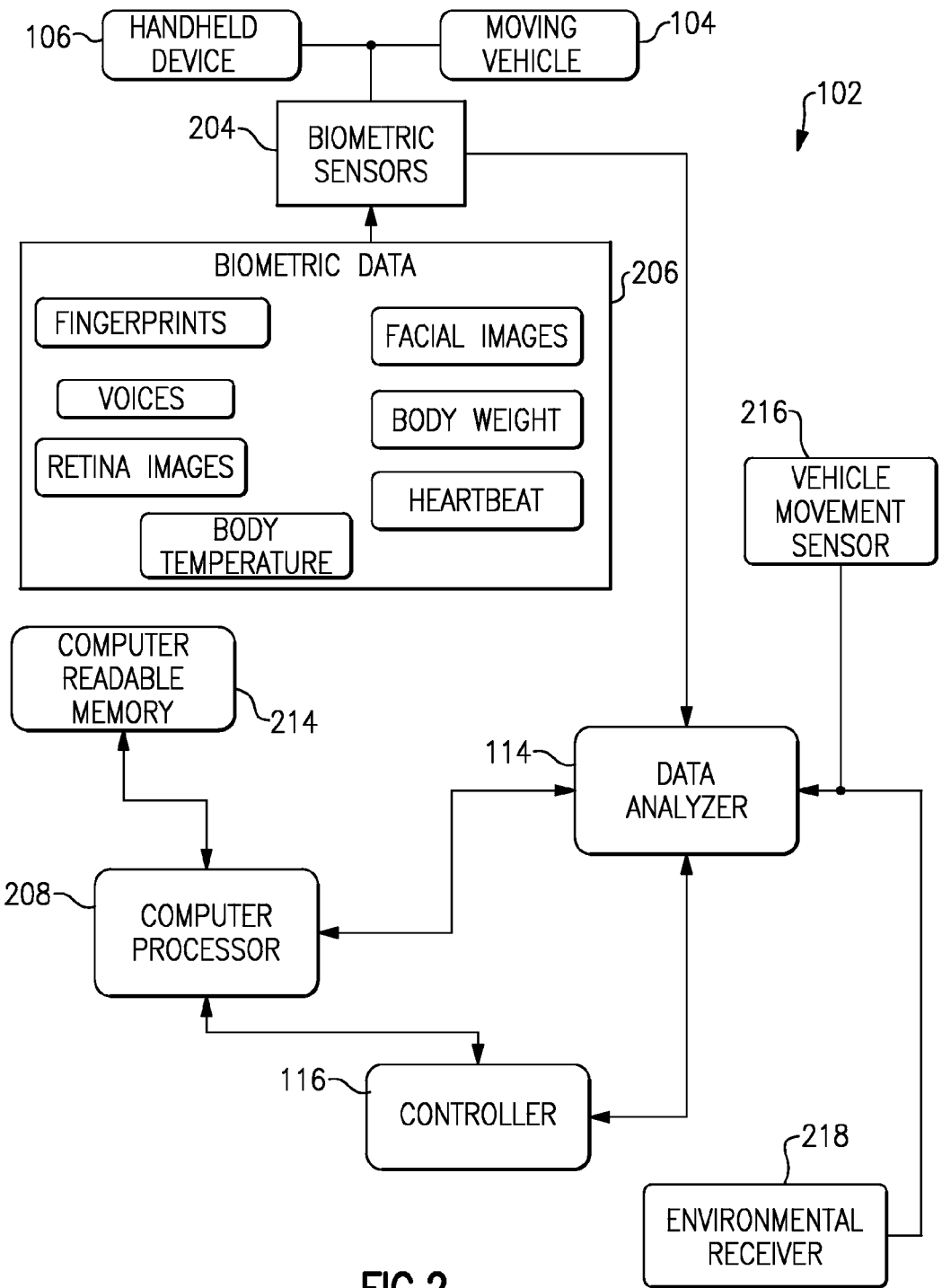

FIG. 2 provides further detail about the example system 102 for preventing a driver of a moving vehicle from using a handheld device while driving. As depicted, a plurality of biometric sensors 204 are located on a handheld device 106 and in a moving vehicle 104. The biometric sensors 204 are configured to receive biometric data from the driver of the moving vehicle and the user of the handheld device. Biometric data may refer to any distinctive physical attributes of an individual. The biometric data 206 may include digital representations of fingerprints, voice patterns, facial images, retina images, heartbeat, body weight, and/or body temperature.

The data analyzer 114 may use a computer processor 208 to analyze, contemporaneously with operation of the vehicle and the handheld device, the biometric data in order to determine a match between the identity of the vehicle driver and the user of the handheld device. In various embodiments of the invention, the biometric data is stored in computer readable memory 214 coupled to the computer processor 208. The controller 116 may also use the computer processor 208. In one embodiment, the controller 116 retrieves the driver's biometric data stored in the computer readable memory 214 when the biometric data is sensed by one of the plurality of biometric sensors 204 on the handheld device 106.

The controller 116 may be configured to selectively interrupt operation of the vehicle or the handheld device upon detecting a match between the biometric data at the handheld device and the vehicle driver. In one embodiment of the invention, the system includes at least one vehicle movement sensor 216 can receive vehicle data. The vehicle data may include vehicle speed, magnitude and frequency of steering wheel movement, magnitude and frequency of vehicle acceleration, magnitude and frequency of vehicle deceleration, headlight usage, and/or windshield wiper usage. Based on the vehicle data, the controller 116 may be further configured enable or disable the handheld device under certain conditions. For example, the controller 116 may be configured not to disable operation of the handheld device when the vehicle is not moving.

The controller 116 may also be connected to an environment receiver 218 that reads environmental data. The environmental data may include weather conditions, road conditions, daylight conditions, and/or traffic conditions. Thus, the controller 116 can be configured to selectively interrupt operation of the vehicle or the handheld device 106 based on the environmental data and the vehicle data.

Figure 3:
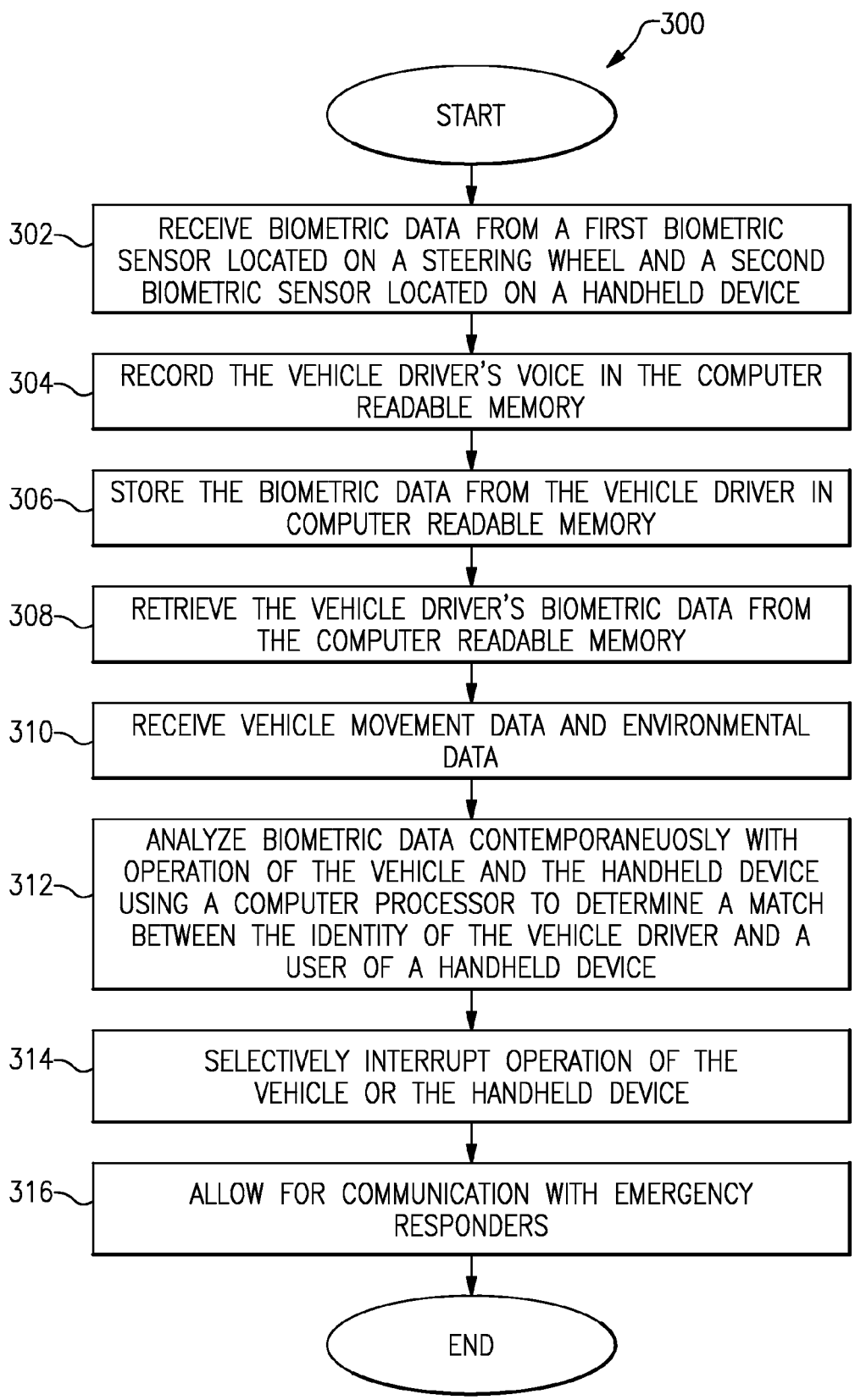
FIG. 3 shows an example flowchart illustrating operations for preventing a vehicle driver from using a handheld device while operating a vehicle.

FIG. 3 is a flowchart illustrating operations for preventing a vehicle driver from using a handheld device while operating a vehicle, as contemplated by one embodiment of the present invention. It is contemplated that embodiments of the invention may include only a portion of the operations shown in the flowchart.

Operations begin at block 302 and include receiving biometric data from a first biometric sensor scanning fingerprints located on a steering wheel and a second biometric sensor scanning fingerprints located on a handheld device. Fingerprints may be initially scanned and registered through a fingerprint capture device in the automobile to address the fact that users might hold the handheld device and the steering wheel in different places. For example, the driver upon entry may be required to hold the steering wheel in predetermined positions in order to capture fingerprints.

Continuing to block 304, the vehicle driver's voice is recorded in the computer readable memory to later be compared with biometric data received from the handheld device. Speaker identification may include registering the driver's voice upon entry and storing the voice pattern in computer readable memory. In one embodiment, speaker recognition may be coupled with one of the other identification metrics, such as fingerprints. When the driver speaks on a cellular phone, the voice detected by the biometric sensors at the cellular phone may be matched to the previously stored voice template from the driver.

The flowchart 300 may also include, at block 306, storing other biometric data from the vehicle driver in computer readable memory. The biometric data may include, but is not limited to, digital representations of facial image, retina images, heartbeat, body weight, and/or body temperature. Furthermore, the method may include, at block 308, retrieving the vehicle driver's biometric data from the computer readable memory in order to identify the driver when the biometric data is read by a biometric sensor on the handheld device.

In addition, operations may also, at block 310, include receiving environmental data. As mentioned above, the environmental data may include, but is not limited to, weather conditions, road conditions, and/or traffic conditions. Likewise, the method may include receiving vehicle data. The vehicle data includes, for example, vehicle speed, magnitude and frequency of steering wheel movement, magnitude and frequency of vehicle acceleration, magnitude and frequency of vehicle deceleration, daylight conditions, headlight usage, and/or windshield wiper usage.

Once received, at block 312, the biometric data can be analyzed contemporaneously with operation of the vehicle and the handheld device. Using a computer processor, the data analyzer determines whether there is a match between the identity of the vehicle driver and the user of the handheld device. The computer processor may be coupled to computer readable memory storing the vehicle driver's biometric data. When biometric data is read by a biometric sensor on the handheld device, the vehicle driver's biometric data may be retrieved in order to determine if a match exists.

Upon detecting a match control passes to block 314, which selectively interrupt operation of the vehicle or the handheld device. The selection to interrupt operation of the vehicle/handheld device upon detecting the match can also be dependent on the environmental data and the vehicle data. Moreover, interrupting operation of the handheld device may not be performed when the vehicle is not moving. Interrupting operation of the vehicle or the handheld device can include issuing a warning to the vehicle driver to stop using the handheld device. The method may further include disabling the vehicle if the handheld device cannot be selectively disabled. However, the method may also include, at block 316, allowing for communication with emergency responders after selectively interrupting operation of the handheld device.

Figure 4:
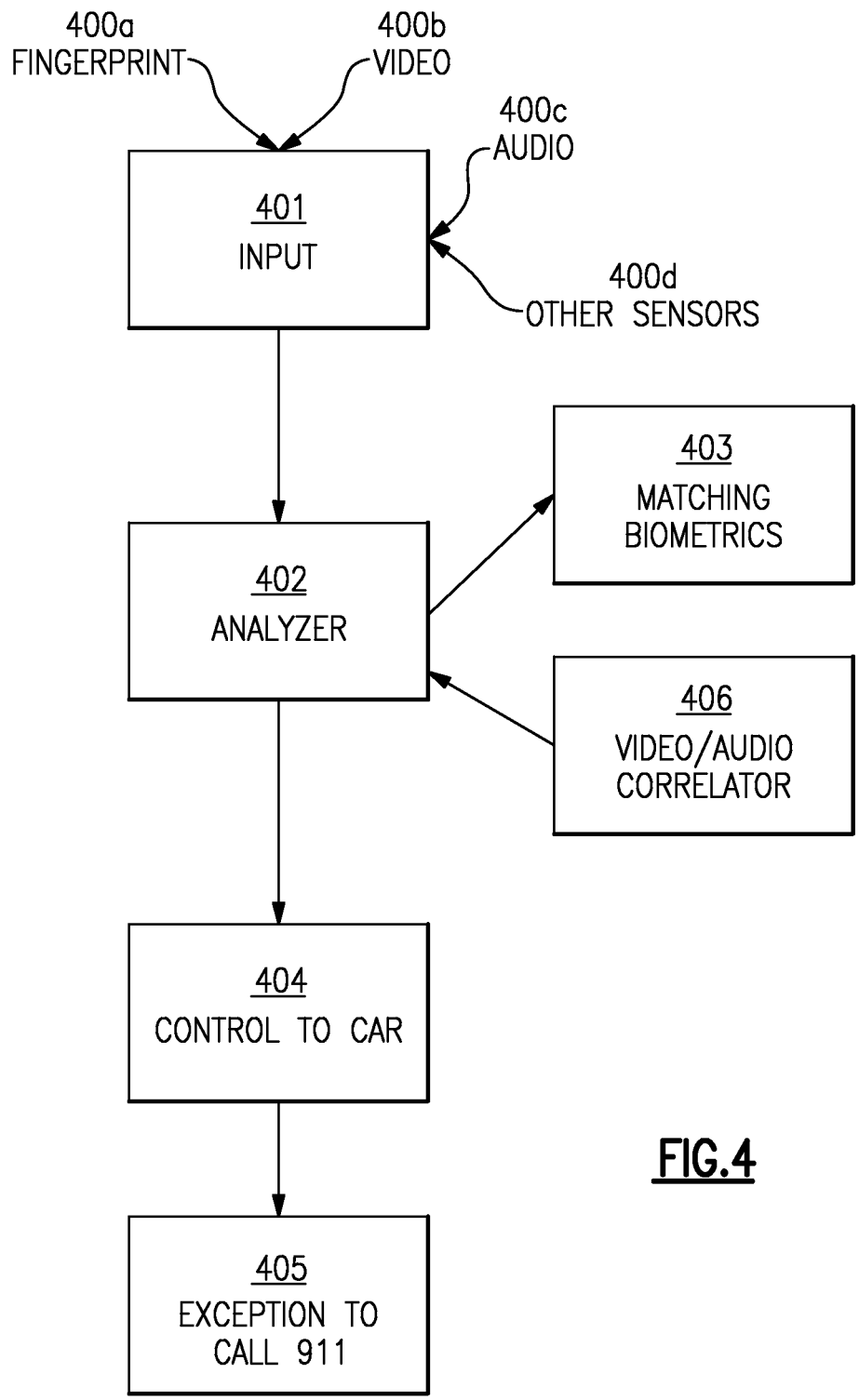
FIG. 4 shows another example system for preventing usage of a handheld device while operating a vehicle.

FIG. 4 is an example system illustrating operations performed by one embodiment of the present invention. A "manager" may receive 401 inputs from video, audio, speaker identification, fingerprints, pulse, and other biometrics (400a-d). An analyzer 402 assesses input data in order to determine matching biometrics 403. In addition, the analyzer may correlate additional data collected from previously installed video and audio systems with the matching biometric data. For example, a camera installed in the vehicle may identify the driver, while speaker identification can identify who is speaking on a cellular phone. Combining the camera-identified information about the driver and the speaker identification about the speaker may allow for a more accurate determination that the driver is using a cellular phone.

The controller 404 may function as the decision-maker given the previous input. Statistical analysis may be involved in this decision. For example, if a statistical threshold is reached when matching the input data, then a decision may be made. If the conclusion is ambiguous, a determination can be made to gather additional biometrics. When the controller makes the decision, it can include numerous conditions, such as driver's age, speed of car, and other external conditions. Based on this determination, the controller can provide various responses, such as requesting the driver to stop using the handheld device, or, if deemed necessary, disabling the handheld device. The system may also be designed to inform police in the event that the handheld device cannot be disabled. In one embodiment of the invention, at block 405, the handheld device may be disabled for the driver, but a channel can remain open to enable the driver to contact emergency responders.

Figure 5:
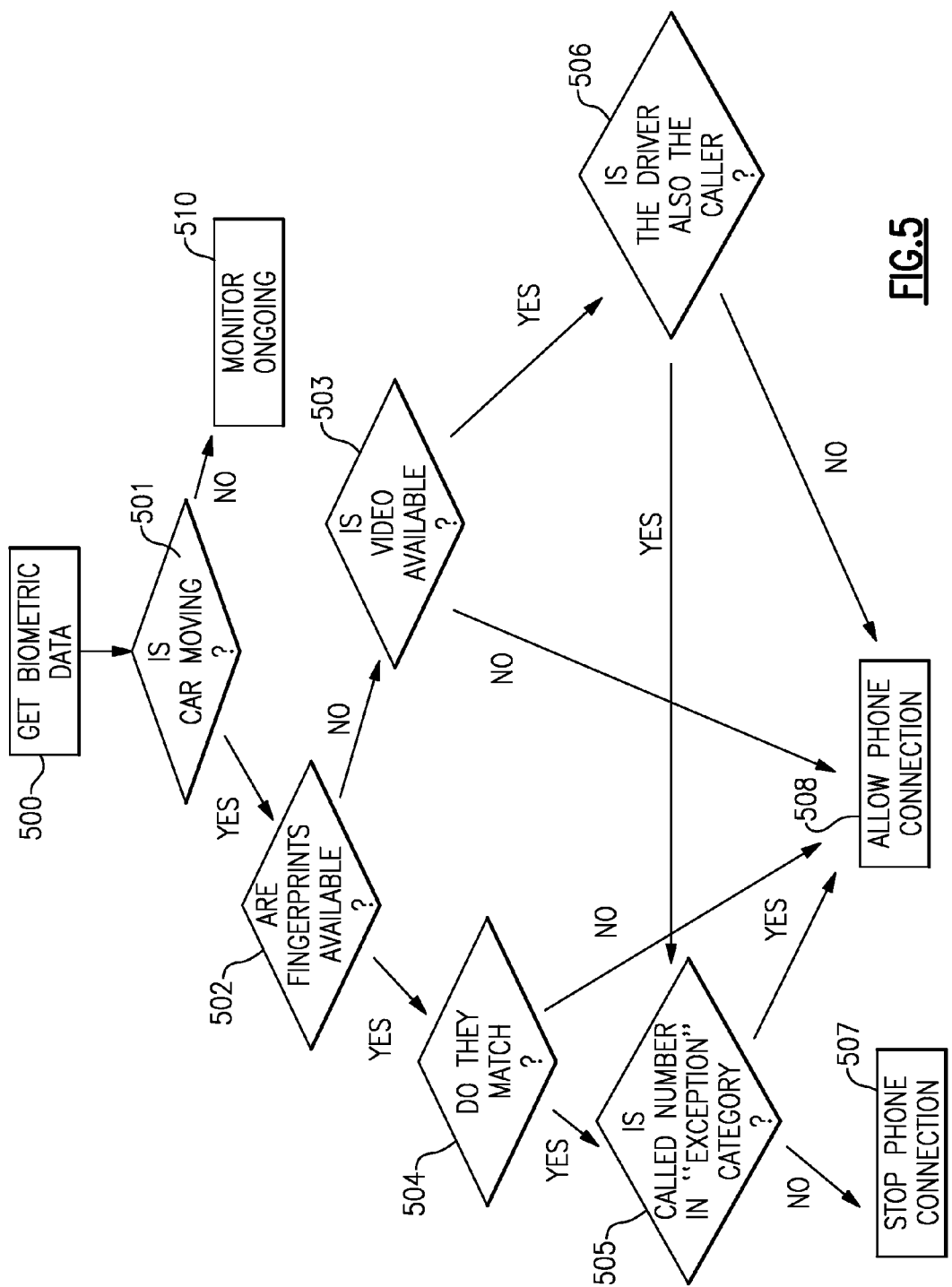
FIG. 5 shows another example flowchart for preventing a vehicle driver from using a handheld device while operating a vehicle.

FIG. 5 illustrates a flowchart for a particular embodiment of the invention. At block 500, system detects biometric data. Next, at block 501, the system may determine whether the car is moving. If the car is not moving, then monitoring may continue at block 510. At block 502, the system may determine whether fingerprints are available in biometric data. If the fingerprints are available in biometric data, then, at block 504, the system can check whether the biometrics match.

If fingerprints are not available, then the system, at block 503, can determine whether other data, such as video, is available. If the video identifies the driver as the caller, at block 506, the system may determine if the call is to an emergency responder at block 505. If the video at block 506 indicates that the driver is not the caller, then the system may allow the phone connection to continue at block 508.

If matched fingerprints of the driver and the handheld device operator are determined at block 504, the system may determine whether the number that the caller is using falls into the "exception" category, such as a call to 911, at block 505. If the called number is in fact included in the "exception" category, then, at block 508, the system may allow the phone connection to continue unimpeded.

A specialized method of matching fingerprint data may be necessary since the fingers that are being matched are from different hands and potentially from different fingers on both hands. Depending on how the individual holds the steering wheel and the handheld device, the sensor may pick up an index fingerprint from one sensor and a thumbprint from another sensor. In one embodiment, the invention may include storing digital representations of multiple fingerprints in order to increase the likelihood of creating a match.

An aspect of the invention may include using random partial biometric data since the fingerprint might only be partially available. In one variation, the aggregate of multiple fingerprints only partially available can be amalgamated to create a confident identification. In U.S. Pat. No. 6,735,695, issued May, 11, 2004, entitled, "Methods and apparatus for restricting access of a user using random partial biometrics," an approach to identifying a device user using partial biometrics is disclosed. U.S. Pat. No. 6,735,695 is incorporated herein by reference in its entirety. A specific sample of data containing partial biometric data may be compared to the corresponding portion of the stored biometric prototype using a set of image coordinates. An embodiment of the present invention may include placing biometric sensors in multiple locations on the handheld device. For example, fingerprint sensors may be located on both the keypad of the back of the device.

As will be appreciated by one skilled in the art, aspects of the invention may be embodied as a system or a method. Since none of the individual biometric systems are foolproof, the combined effects of biometrics strengthen the likelihood of correct identification. By combining and synchronizing both biometric and non-biometric features with one another, the system can reduce the chance of an incorrect determination.

In a particular embodiment of the invention, a predetermined statistical analysis can be used to determine the likelihood of a match using multiple biometric data sources. In one variation, there may be specific statistical thresholds, which must be reached in order for a particular decision to be made. The statistical threshold may be dependent on the analysis of the biometric data as well as the environmental and vehicle conditions. For example, if the analysis reaches a predetermined specific threshold, the controller may only send a warning to the driver to stop using the device. However, if the match is more likely to be correct, a different statistical threshold may be reached in order for the device to be disabled.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention have been described, it will be understood that those skilled in the art, both now and in the future, may make various improvements and enhancements which fall within the scope of the claims which follow. Thus, the claims should be construed to maintain the proper protection for the invention first described.

What is claimed is:

1. A method for preventing a vehicle driver from using a handheld device while operating a vehicle, the method comprising:
   analyzing biometric data contemporaneously with operation of the vehicle and the handheld device using a computer processor to determine a match between the identity of the vehicle driver and a user of the handheld device; and
   selectively interrupting operation of one of the vehicle and the handheld device upon detecting the match; and
   wherein selectively interrupting operation of one of the vehicle and the handheld device includes allowing for communication with emergency responders via the handheld device.

2. The method of claim 1, wherein the biometric data includes a digital representation of at least one of fingerprints, voice pattern, facial image, retina images, heartbeat, body weight, and body temperature.

3. The method of claim 1, further comprising receiving the biometric data from a first biometric sensor located on a steering wheel of the vehicle and a second biometric sensor located on the handheld device.

4. The method of claim 1, further comprising:
storing the biometric data from the vehicle driver in computer readable memory; and
retrieving the vehicle driver's biometric data from the computer readable memory in order to identify the driver when the biometric data is read by a biometric sensor on the handheld device.

5. The method of claim 4, further comprising recording the vehicle driver's voice in the computer readable memory to later be compared with biometric data received from the handheld device.

6. The method of claim 1, further comprising:
receiving vehicle movement data; and
wherein selectively interrupting operation of one of the vehicle and the handheld device is not performed when the vehicle is not moving.

7. The method of claim 1, wherein selectively interrupting operation of one of the vehicle and the handheld device includes selectively disabling the vehicle if the handheld device cannot be disabled.

8. The method of claim 1, wherein selectively interrupting operation of one of the vehicle and the handheld device includes issuing a warning to the vehicle driver to stop using the handheld device.

9. The method of claim 1, further comprising:
receiving environmental data, the environmental data including at least one of weather conditions, road conditions, and traffic conditions;
receiving vehicle data, the vehicle data including at least one of vehicle speed, magnitude and frequency of steering wheel movement, magnitude and frequency of vehicle acceleration, magnitude and frequency of vehicle deceleration, daylight conditions, headlight usage, and windshield wiper usage; and
wherein selectively interrupting operation of one of the vehicle and the handheld device is dependent on the environmental data and the vehicle data.

10. A system for preventing a driver of a moving vehicle from using a handheld device while driving, the system comprising:
a plurality of biometric sensors configured to receive biometric data from the driver and a user of the handheld device;
a data analyzer configured to analyze, contemporaneously with operation of the vehicle and the handheld device, using a computer processor, the biometric data in order to determine a match between the identity of the vehicle driver and the user of the handheld device; and
a controller configured to selectively interrupt operation of one of the vehicle and the handheld device upon detecting the match; and
wherein the plurality of biometric sensors include a first biometric sensor located on the handheld device and a second biometric sensor located a steering wheel of the vehicle.

11. The system of claim 10 wherein the plurality of biometric sensors are configured to detect at least one of fingerprints, voices, retina images, facial images, heartbeat, body weight, and body temperature.

12. The system of claim 10, further comprising:
computer readable memory coupled to the computer processor; and
wherein the controller is further configured to store the biometric data from the driver in the computer readable memory and retrieve the driver's biometric data from the computer readable memory when the biometric data is read by one of the plurality of biometric sensors on the handheld device.

13. The system of claim 10, further comprising:
wherein the plurality of biometric sensors include a first pulse detector located on a steering wheel of the vehicle and a second pulse detector located on the handheld device; and
wherein the data analyzer is configured determine if a first received pulse from the first pulse detector is synchronized with a second received pulse from the second pulse detector.

14. The system of claim 10, further comprising:
a vehicle movement sensor configured to receive vehicle movement data; and
wherein the controller is configured not to interrupt operation of one of the vehicle and the handheld device when the vehicle is not moving.

15. The system of claim 10, wherein the controller is configured not to interrupt operation of one of the vehicle and the handheld device when the user of the handheld device is communicating with emergency responders.

16. The system of claim 10, further comprising:
an environment receiver configured to receive environmental data, the environmental data including at least one of weather conditions, road conditions, daylight conditions, and traffic conditions;
at least one vehicle sensor configured to receive vehicle data, the vehicle data including at least one of vehicle speed, magnitude and frequency of steering wheel movement, magnitude and frequency of vehicle acceleration, magnitude and frequency of vehicle deceleration, headlight usage, and windshield wiper usage; and
wherein the controller is configured to selectively interrupting operation of one of the vehicle and the handheld device based upon the environmental data and the vehicle data.

17. A computer program product for preventing a vehicle driver from using a handheld device while operating a vehicle, the computer program product comprising:
a non-transitory computer readable storage medium having computer readable program code embodied therewith, the computer readable program code configured to:
analyze biometric data contemporaneously with operation of the vehicle and the handheld device to determine a match between the identity of the vehicle driver and a user of the handheld device;
selectively interrupting operation of one of the vehicle and the handheld device upon detecting the match; and
selectively disable the vehicle if the handheld device cannot be selectively disabled.

18. The computer program product of claim 17, further comprising computer readable program code to receive the biometric data from a first biometric sensor located on a steering wheel of the vehicle and a second biometric sensor located on the handheld device.

19. The computer program product of claim 17, further comprising computer readable program code to:
store the biometric data from the vehicle driver in computer readable memory; and
retrieve the vehicle driver's biometric data from the computer readable memory in order to identify the driver when the biometric data is read by a biometric sensor on the handheld device.

20. The computer program product of claim 17, further comprising computer readable program code to record the vehicle driver's voice in the computer readable memory to later be compared with biometric data received from the handheld device.

21. The computer program product of claim 17, further comprising computer readable program code to:
   receive vehicle movement data; and
   wherein interrupting operation of one of the vehicle and the handheld device is not performed when the vehicle is not moving.

22. The computer program product of claim 17, wherein selectively interrupting operation of one of the vehicle and the handheld device includes allowing for communication with emergency responders.

* * * * *